March 3, 1959     J. JARVIS     2,875,964

AIRCRAFT CONTROL SYSTEM

Filed April 22, 1954

INVENTOR.
JOHN JARVIS
BY
Oscar B. Brumback
ATTORNEY

United States Patent Office 2,875,964
Patented Mar. 3, 1959

2,875,964

AIRCRAFT CONTROL SYSTEM

John Jarvis, Dumont, N. J., assignor to Bendix Aviation Corporation, Teterboro, N. J., a corporation of Delaware Application April 22, 1954, Serial No. 424,933

11 Claims. (Cl. 244—77)

This invention relates generally to control systems for aircraft and more particularly to control systems for maintaining an aircraft at a constant altitude during turning.

When an aircraft is flying straight and level, the lift developed by the wings is perpendicular to the pull of gravity. However, when the craft banks to turn, the lift is at an angle to the pull of gravity so only a component of the lift is available to support the weight of the aircraft and the aircraft tends to lose altitude.

To compensate for the tendency to lose altitude, the elevators may be raised to increase the angle of attack and thereby increase the available lift. Thus, while the craft banks to the right or to the left, the elevators must be always raised upwardly to keep from losing altitude. This means that the control effect for the elevators must be always of one sense although the signal corresponding to left and right turns are of opposing senses. Heretofore, this has been accomplished by relay systems or various electronic switching systems. While these systems worked well, they did occupy considerable space and added to the weight of the systems.

An object of the present invention is, therefore, to provide a novel device for maintaining an aircraft at a constant altitude during turns which does not require electronic switches or mechanical switches.

Another object of the invention is to provide a novel apparatus for obtaining a signal of constant phase and variable amplitude from a signal which changes in phase and amplitude.

A further object is to provide a novel arrangement for using signal pick-off devices to obtain a signal of single phase from a signal of reversible phase.

The present invention contemplates a novel system for "up-elevator" control when a craft is turned, the system utilizing a roll attitude signal pick-off as a transmitter in cooperation with a receiver system whose output varies in amplitude with the extent of the bank of the craft, but whose phase remains fixed for right and left turns.

The foregoing and other objects and advantages of the invention will appear more fully hereinafter from a consideration of the detailed description which follows, taken together with the accompanying drawing, wherein one embodiment of the invention is illustrated. It is to be expressly understood, however, that the drawing is for purposes of illustration and description, and is not to be construed as defining the limits of the invention.

In the single sheet of drawing:

Fig. 1 schematically illustrates the novel signal generating system of the present invention incorporated in an automatic pilot system;

Figure 1:
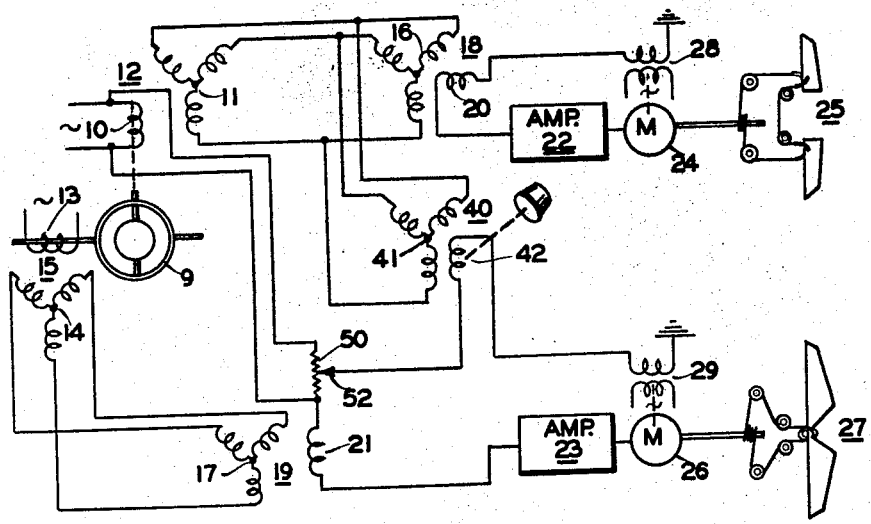
Figure 2:
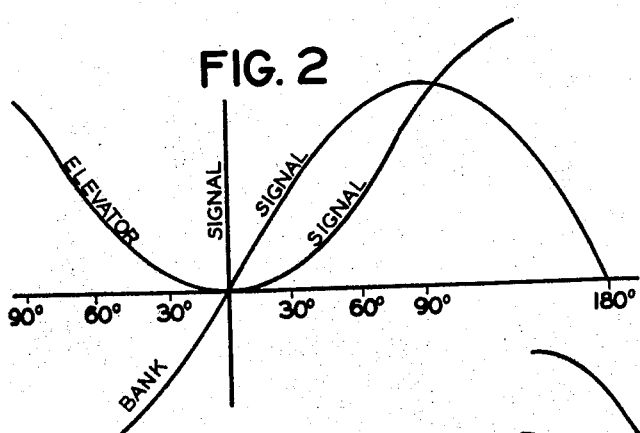
Fig. 2 illustrates the voltage developed by the novel system of Fig. 1 during right and left turns.

Turning now to Fig. 1 of the drawings, the novel "up-elevator" circuit of the present invention has been incorporated in a conventional automatic pilot system such as that described in U. S. Patent No. 2,625,348, issued January 13, 1953, to P. A. Noxon et al. In a known manner in the embodiment herein, a conventional vertical gyroscope 9 responds to displacements of the craft about the pitch and roll axes; displacement about the roll axis causing relative displacement of rotor 10 and stator 11 of inductive device 12, and displacement about the pitch axis causing relative displacement of rotor 13 and stator 14 of inductive device 15. Rotors 10 and 13 are energized, and stators 11 and 14 are connected to stators 16 and 17 of inductive devices 18 and 19 which are in a conventional manual controller (not shown).

Inductive devices 12 and 15 constitute conventional transmitters and inductive devices 18 and 19 conventional receivers. In such transmitter-receiver combinations, the energized rotor winding of the transmitter, by inducing three different voltages in the stator windings of the transmitter, causes currents to flow in the stator windings of the receiver where they set up a resultant field which corresponds to or follows the angular displacement of the energized rotor winding of the transmitter, the field shifting when any change occurs in the three stator voltages of the transmitter. The rotor of the receiver inductive device is normally in a null position, i. e., its poles are perpendicular to the resultant stator field, where no signal is induced in the rotor winding. However, if the position of either the rotor or the field of the stator winding is shifted, the rotor will no longer be in a null position, and an electrical signal is induced in the rotor.

The signal induced in the rotor varies sinusoidally with the displacement of the rotor from a null position, being zero at a null position and increasing to a maximum at a position at right angles to the null position in accordance with the expression $S = V \sin \phi$ where S is the signal voltage,
V is the maximum voltage, and
$\phi$ is the angle of displacement of the rotor winding from a null position.

Rotor windings 20 and 21 are connected to servo amplifiers 22, 23, respectively, where the level of the signal is amplified and the phase of the signal detected. The output of amplifier 22 energizes an induction motor 24 to move aileron surfaces 25, and the output of amplifier 23 energizes a servomotor 26 to move elevator surface 27. Each motor actuates a follow-up device 28 or 29 which develops a follow-up signal in opposition to the displacement signal in each control channel. Thus, as the follow-up signal becomes equal and opposite to the displacement signal, the motor stops with the surface displaced. The system so far described is conventional.

In accordance with the present invention, a novel arrangement is provided for developing an "up-elevator" signal for the pitch control channel when the aircraft rolls to turn. To this end, an inductive device 40 as a receiver has its stator windings 41 connected in parallel with the stator windings 11 of the transmitter inductive device 12. However, rotor 42 is positioned relative to stator 41 so that the output corresponds to the cosine function of the displacement of rotor 10. Thus, when rotor winding 10 is at a null position, the output from rotor winding 42 is at a maximum value.

To keep the output from rotor winding 42 from developing an "up-elevator" condition when the craft is at level attitude, a potentiometer 50 is connected across rotor 10 and wiper 52 is connected to rotor winding 42. Wiper 52 is so positioned that the output of potentiometer 50 cancels the output of rotor 42, and the net value of the two signals is zero. To complete the circuit in the elevator control channel, rotor winding 42, follow-up device 29, potentiometer 50 and rotor winding 21 are connected in series to the input of amplifier 23.

In accordance with the present invention, rotor winding 10, being energized, induces voltages in each of the three legs of stator winding 11 setting up a resultant field which is reproduced in stator winding 41. Rotor winding 42 is so positioned that the output from this rotor corresponds to a function of $V \cos \alpha$ where $\alpha$ is the angular displacement of rotor 10. This output being a maximum at level flight, the wiper 52 of potentiometer 50 is so adjusted that the output exactly balances the output of rotor winding 42 when rotor winding 10 is at a null position. Thus, a displacement of rotor 10 in either direction from a null position decreases the voltage output of rotor winding 42 so that the output of potentiometer 50 prevails and provides for "up-elevator" action in the pitch control channel.

As a mathematical analysis of the foregoing, it will be evident that V is the voltage at rotor 10 and $K_0V$ is the voltage at wiper 52, $K_0$ being a constant for the attenuation effect of the potentiometer and wiper. The output of rotor winding 42 then is $K_2V \cos \alpha$ where $\alpha$ is the angular displacement of rotor 10 from null and $K_2$ is a constant for the attenuation effect of the circuit.

By adjusting $K_0$ in the equation of the network which is $K_0V - K_2V \cos \alpha$, the output may be zeroed.
Thus $K_0V = K_2V$ when $\alpha = 0$.
The output $V_3$ for any value of $\alpha$ is $V_3 = K_0V - K_2V \cos \alpha$.
The output $V_3$ is the versine function of $\alpha$.

Figure 3:
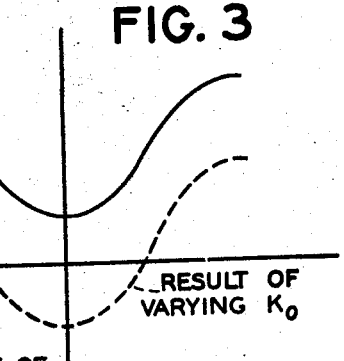
Fig. 3 illustrates the manner in which the "up-elevator" voltage may be varied for aircraft of differing characteristics.
Figure 4:
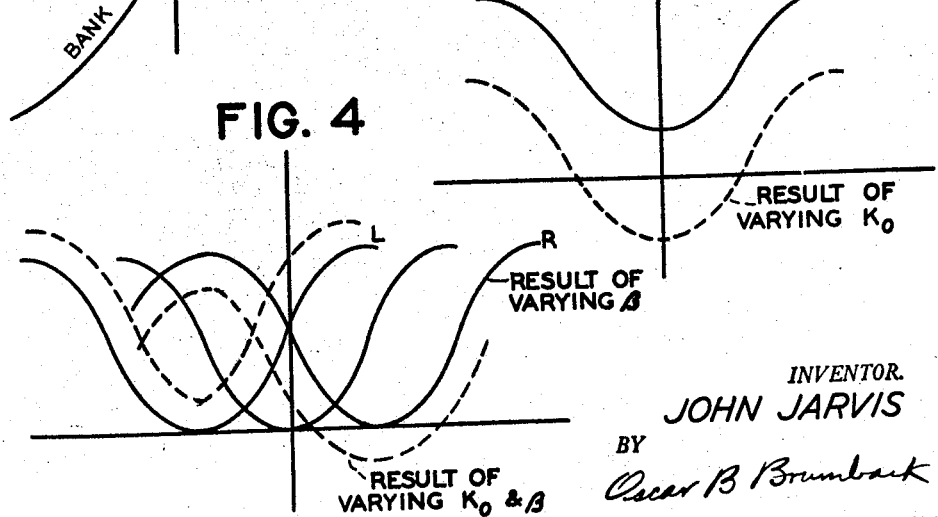
Fig. 4 illustrates a family of curves showing combination of the voltage being varied.

Due to gyroscopic effect of the propellers spinning in a clockwise direction, an aircraft tends to lose a greater altitude when the craft is turned to the left than when it is turned to the right. To compensate for this and other aircraft, inequalities, the horizontal axis of the versine curve may be shifted by adjusting $K_0$, this being shown in Fig. 3 and the vertical axis may be adjusted or shifted by changing the vector portion of the output V by shifting the angular position of rotor 42 through an angle $\beta$ so $V_3 = K_0V - K_2V \cos(\alpha \pm \beta)$. The former adjustment provides a pitch trim or steady signal for level roll attitudes, and the latter adjustment provides an unsymmetrical signal for bank angles on the left side of the level roll attitude relative to the same bank angle on the right side so as to correct for the above described gyroscopic effect. Both adjustments may be made if desired.

The value of $\beta$ preferably is not more than 4° to avoid a substantial decrease in "up-elevator" signal or a substantial "down-elevator" signal when the aircraft begins to roll in one direction from a level roll attitude.

The foregoing has presented a novel system for maintaining an aircraft at a constant altitude during turns by supplying an "up-elevator" signal to increase the angle of attack of the craft and thereby increase the lift developed by the wings, the system utilizing a conventional transmitter-receiver pick-off system. The output of the system is readily adjusted for the characteristics of the aircraft with which it is to be used.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

What I claim is:

1. An aircraft control system comprising signal responsive actuating means for controlling the elevator surface to increase the angle of attack and thereby the available lift developed by said aircraft, and signal means for said actuating means including transmitting and receiving devices, each device having a rotor and a stator, the rotor of said transmitting device being movable in response to roll displacement of the craft and the rotor of said receiving device being relatively fixed with the craft, said devices developing at the rotor of said receiver a signal having a sense and magnitude variable in accordance with a sinusoidal function of the relative displacement of said rotors from a null position, said receiving device rotor being positioned so that the signal is of maximum magnitude when said craft is in a level roll attitude and decreases when the craft rolls in either direction, means for developing a balance signal whose magnitude is equal to and whose sense is opposite to said maximum signal magnitude, and means for combining the signals so that said balance signal prevails to operate said actuating means as the magnitude of said first-mentioned signal decreases when the craft departs from a level roll attitude.

2. A control system for aircraft having a movable surface for controlling the pitch attitude of the craft, signal responsive actuating means for moving said surface, transmitting and receiving inductive devices, each device having a rotor and a stator, means energizing the rotor of said transmitting device with alternating current whereby the rotor of said receiving device develops a signal having a phase and amplitude variable in accordance with a sinusoidal function of the relative displacement of said rotors from a null position, reference means responsive to roll displacement of the craft, the rotor of said transmitting device being positioned by said reference means and the rotor of said receiving device being relatively fixed in a position such that the signal is of maximum amplitude when the craft is in a predetermined attitude and decreases when the craft rolls in either direction from the predetermined attitude, and means for developing a constant balance signal whose amplitude is equal to and whose phase is opposite to said maximum signal amplitude, and means for combining the signals so that the difference between said first-mentioned and said last-mentioned signals provides a net signal for operating said servomotor as said first-mentioned signal decreases when said craft departs from the predetermined attitude.

3. A control system for aircraft having a movable surface for controlling the pitch attitude of the craft, comprising signal responsive actuating means for moving said surface, a two part signal means for developing at one of said parts a signal having a phase and amplitude variable in accordance with a sinusoidal function of the relative displacement of said parts from a null position, reference means responsive to roll displacement of the craft from a normal roll attitude for positioning one of said parts, adjustable means for relatively fixing the other of said parts in a position to provide a signal of substantial amplitude when said craft is in a normal roll attitude and to provide an unsymmetrical signal for a given roll displacement on one side of normal roll attitude relative to the same roll displacement on the other side, and means for developing a balance signal having an amplitude equal and a phase opposite to said substantial amplitude, and means for combining the signals so that the summation of said first-mentioned signal and said last-mentioned signal provides a signal for operating said actuating means when said craft departs from a normal roll attitude.

4. A control system for aircraft having a movable surface for controlling the pitch attitude of the craft, comprising signal responsive actuating means for moving said surface, signal means having two parts relatively movable from a null position for developing a signal having a sense and magnitude variable in accordance with a sinusoidal function of the relative movement, reference means responsive to the roll attitude of the craft for positioning one of said parts, means for relatively fixing the other of said parts in a position so that the signal is of maximum magnitude when the craft is in a predetermined attitude and decreases when the craft rolls in either direction from the predetermined attitude, and means for developing a constant signal having a magnitude equal and opposite to said maximum signal magnitude and means for combining the signals so that said first-mentioned signal decreases when said craft departs from the predetermined attitude and said last-mentioned signal prevails to provide a resultant signal to operate said actuating means.

5. A control system for aircraft having a movable surface for controlling the pitch attitude of the craft, comprising a servomotor for moving said surface, signal means having two parts relatively displaceable from a null position for developing a signal having a sense and magnitude variable in accordance with a sinusoidal function of the relative position of said parts, reference means responsive to the displacement of the craft from a predetermined attitude of the craft for positioning one of said parts, the other of said parts being relatively fixed with the craft in a position where maximum signal magnitude is developed when the craft is in the predetermined attitude, means for developing a balance signal having a constant magnitude equal and opposite to said maximum signal magnitude, means connecting said signals in opposed relation to provide a resultant signal as the magnitude of said first-mentioned signal decreases as said craft rolls from the predetermined attitude, said resultant signal always being of the same sense for departure of the craft in either direction about the roll axis from the predetermined attitude, means for adjusting the magnitude of said first-mentioned signal at the predetermined attitude, means for operating said servomotor from said resultant signal, and means for adjusting the magnitude of said last-mentioned signal whereby the system may be adjusted for optimum operation of said craft.

6. In a control system, transmitting and receiving inductive devices each having a rotor and a stator, said devices developing a signal having a sense and magnitude variable in accordance with a sinusoidal function of the relative displacement of said rotors from a null position, condition responsive means for positioning the rotor of said transmitting device, manually operable means for positioning the rotor of said receiving device so that the signal is of maximum magnitude when said transmitting device is in a normal position and decreases when the transmitting device departs therefrom, means for developing a balance signal having a constant magnitude equal and opposite to said maximum signal magnitude, and means connecting said receiving device and said last-mentioned means in opposed relation to balance said system when said transmitting device is in normal position so that no resultant output is developed and to unbalance said system when said transmitting device is displaced upon a change in condition so that said balance signal prevails to develop a resultant output of the same sense regardless of the sense of change in condition.

7. Control apparatus for producing an output corresponding to the versine function of the displacement of a member, comprising transmitting and receiving inductive devices for developing a variable signal, each device having a rotor and a stator, the rotor of said transmitting device being angularly displaced by said member, the rotor of said receiving means being relatively fixed in a position such that said variable signal has a maximum magnitude when said transmitter is in a normal position and has a magnitude varaible as a cosine function of the displacement of the rotor of said transmitting device, means connected with said receiving device for developing a constant signal having a constant amplitude equal ing and opposite to said maximum signal magnitude, and means connecting said receiving device and said last named means in opposed relation whereby said system is balanced when the rotor of said transmitting device is in normal position and the net signal produced when said variable signal decreases upon displacement of the rotor of said transmitting device from normal position is the versine function of the latter displacement.

8. An arrangement for producing a signal of single sense from transmitting and receiving inductive devices which develop a signal having a sense and magnitude variable in accordance with the relative position of said transmitting and receiving devices, comprising means for displacing said transmitting device from a normal position, means for positioning said receiving device to provide a signal of maximum amplitude when said transmitting device is in a normal position and which varies in amplitude as a cosine function of the displacement of said transmitting device, means for developing a signal having a constant amplitude equal and opposite to said maximum signal amplitude, and means connecting said signals in opposed relationship so that the amplitude of said first-mentioned signal decreases upon displacement of said transmitting device and said last-mentioned signal prevails and the net signal has the same sense despite changes in the sense of the relative position of said transmitting and receiving devices.

9. In an aircraft, signal response actuating means for controlling the pitch attitude of said craft, means for developing a first signal whose magnitude has a maximum value at a predetermined attitude of the craft and varies to a minimum value as a cosine function of the displacement of the craft about the roll axis from the predetermined attitude, means for developing a second signal having a constant magnitude value equal and opposite to the maximum value of said first signal, and means algebraically combining said signals to provide a third signal for operating said actuating means.

10. An aircraft control system comprising signal responsive actuating means for controlling the pitch attitude of the craft, means for providing a first signal whose amplitude is a maximum when the craft is in a predetermined attitude and decreases as the craft departs about the roll axis in either direction from the predetermined attitude, means for providing a second signal of constant magnitude substantially equal to the maximum amplitude of the first signal, and means combining the signals in opposition for operating the actuating means.

11. An aircraft control system comprising signal responsive actuating means for controlling the pitch attitude of the craft, means for providing a first signal whose magnitude has a maximum value when the craft is displaced through an angle $\beta$ about the roll axis from a level roll attitude and decreases as the craft rolls in either direction therefrom, means for providing a second signal having a constant amplitude substantially equal to the maximum amplitude of the first signal, and means combining these signals in opposition for operating the actuating means.

References Cited in the file of this patent

UNITED STATES PATENTS

| 2,464,249 | McCoy | Mar. 15, 1949 |
| 2,531,188 | Yates | Nov. 21, 1950 |
| 2,555,019 | Webb | May 19, 1951 |
| 2,585,162 | Noxon | Feb. 12, 1952 |